Dec. 9, 1958 J. H. KYLE 2,863,577
BIN-FILLING DEVICE
Filed Oct. 28, 1955
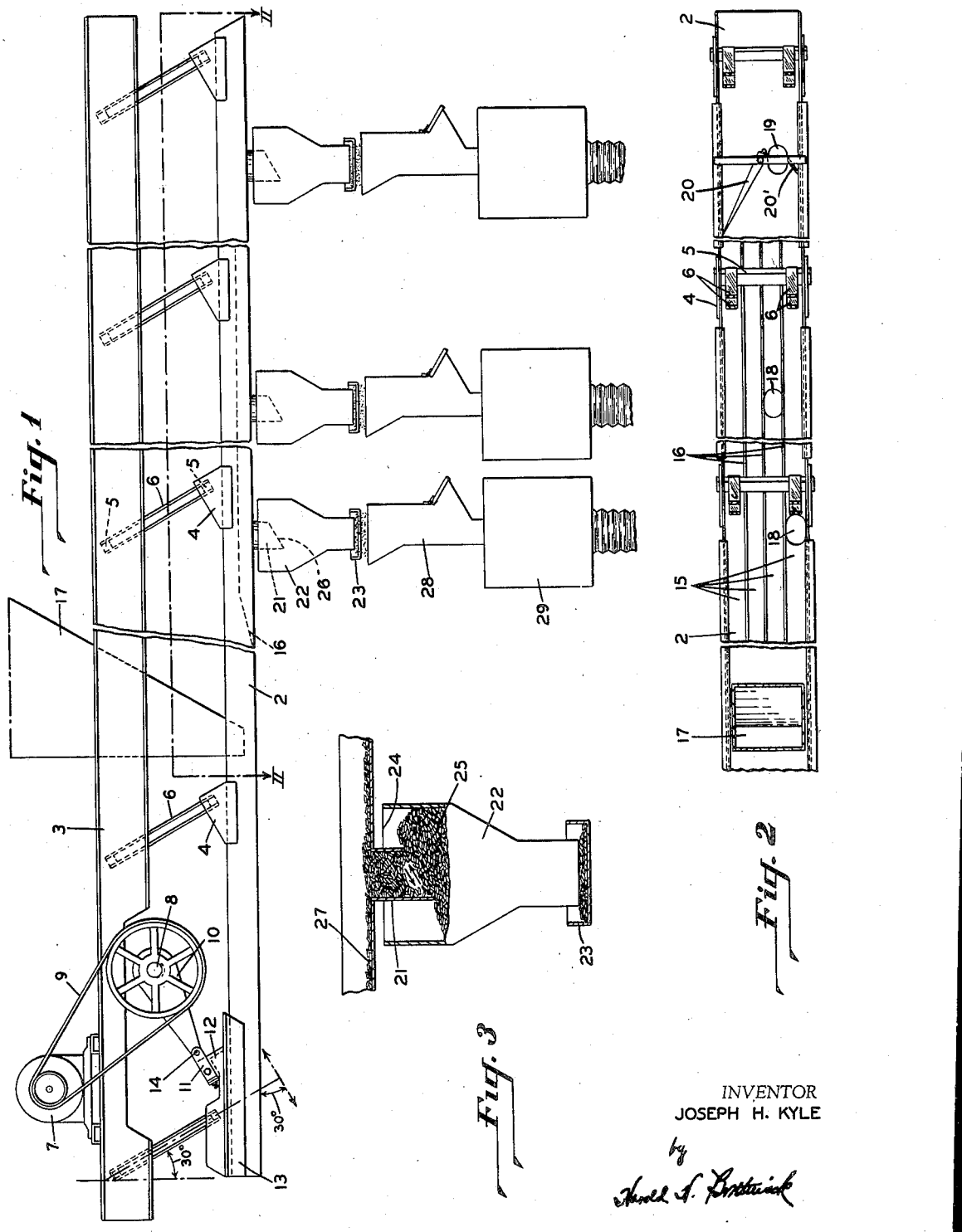
INVENTOR
JOSEPH H. KYLE
ATTORNEY

United States Patent Office 2,863,577
Patented Dec. 9, 1958

2,863,577

BIN-FILLING DEVICE

Joseph H. Kyle, Lancaster, Pa., assignor to Armstrong Cork Company, Lancaster, Pa., a corporation of Pennsylvania Application October 28, 1955, Serial No. 543,492

4 Claims. (Cl. 214—17)

This invention relates to a bin-filling device. It is concerned more particularly with an arrangement for controlling the filling of bins, hoppers, and other receptacles with material delivered by a vibrating conveyor to insure that a maximum predetermined level of material in the receptacle will not be exceeded.

Vibrating conveyors are frequently used to carry material into various operating stations where the material is discharged from the conveyor into a receptacle such as the hopper of a machine to which the material is to be fed for further processing. In some cases, a single conveyor will be arranged to supply a plurality of operating stations. It is sometimes necessary or desirable to control the delivery of material to the operating station to avoid overflow of the material from the receptacle into which it is discharged. For this purpose, gates or valves have been provided in the discharge outlets from the conveyor. These frequently require the presence of a machine operator and where automatically controlled, electrically, pneumatically, or hydraulically, the apparatus is rather costly.

An object of the present invention, therefore, is to provide a simple arrangement which may be combined with any vibrating conveyor and will automatically control the discharge of material therefrom into a receptacle so that the receptacle will never be filled above a maximum predetermined level.

The provision of a discharge spout in the bottom of the trough of a vibrating conveyor which spout projects below the top of the receptacle to be filled will impede the free flow of material into the receptacle when the level of material in the receptacle reaches the bottom of the spout; but as motion of the spout with the vibrating conveyor continues, some additional material will be deposited into the receptacle; and as the level of the material in the receptacle rises above the bottom of the spout, the free vibration of the trough is impeded by the drag of the spout (or spouts if there be multiple discharge outlets provided in the conveyor trough) through the material. This affects the proper movement of the material along the conveyor, since the conveyor is not free to vibrate in its normal manner. Where the receptacle into which the discharge spout is positioned is in the form of a relatively small hopper, for instance, which is delivering material to an operating station, this build-up of material around the spout above the bottom outlet of the spout may also set up undesirable vibrations within the hopper which normally is not mounted to withstand such treatment since in its usual mode of operation it merely receives a mass of material which is discharged therefrom by a volumetric feeder, for example.

Another object of the invention, therefore, is to provide a discharge control arrangement for vibrating conveyors which will prevent the build-up of excessive amounts of material around the discharge spout and thereby will avoid any impediment to the proper feeding of material along the conveyor, or serious vibration of the receptacle into which the spout is disposed.

Other objects of the invention will be clear from the following general statement of the invention and the specific illustration and description of a typical embodiment of the invention which follows.

According to this invention, there is provided in the bottom of the conveyor trough of a vibrating conveyor a delivery spout which leads from a discharge opening in the bottom of the trough. The spout is positioned for disposition within a receptacle below the top thereof and serves to direct material from the conveyor into the receptacle. The terminal edge of the spout is shaped so as to define an opening the general plane of which is disposed at an angle to the horizontal which is substantially the same as the general angle of vibratory motion of the conveyor trough. Thus, when the level of material fed to the receptacle reaches a predetermined height, additional material fed through the discharge opening will fill the spout and thereafter material will be conveyed over the discharge opening in the bottom of the conveyor and the receptacle will not be overfilled. No substantial flow of material into the receptacle will occur thereafter until the level of the material in the receptacle is again reduced, whereupon normal feeding from the vibrating conveyor will resume automatically without human intervention. This insures that the receptacle will never be filled substantially above the desired predetermined maximum level and will always be ready instantly to receive additional material as the level of material in the receptacle decreases. Also, the spout will not become buried in the material delivered to the receptacle and impede free vibration of the conveyor or set up objectionable vibrations in the receptacle or impart objectionable impacts thereto.

In order that the invention may be readily understood, an embodiment thereof will be described in conjunction with the attached drawing in which:

Figure 1 is a side elevational view with sections broken out as indicated, showing, generally diagrammatically, a horizontal vibrating conveyor embodying the invention;

Figure 2 is a sectional view taken along the line 2—2 of Figure 1; and

Figure 3 is a side elevational view partly in section illustrating one of the discharge spouts mounted in position with respect to a discharge hopper delivering material to a vibrating type feeder.

Referring first to Figures 1 and 2 which illustrate a typical vibrating conveyor, there is shown a conveyor trough or pan 2 which is suspended from a channel frame structure 3. Mounting plates 4 are welded or otherwise secured to the frame of the trough 2 to which are secured cross supporting members 5. Similar cross supporting members 5 are provided in the frame structure 3 as shown in dotted lines in Figure 1. Pairs of flat steel springs 6 are welded or otherwise secured to the cross channels 5. Thus, the trough 2 is suspended from the frame 3 and is free to oscillate or vibrate upon deflection of the springs 6. Such motion is imparted to the trough 2 by the mechanism which will now be described.

The drive for the conveyor includes a motor 7 which is mounted on the channel frame structure 3 and drives an eccentric shaft 8 through a belt and pulley arrangement 9, as shown in the drawing. The throw of the eccentric shaft 8 has been indicated in dotted lines in Figure 1. An eccentric arm 10 encircles the eccentric shaft 8 and is connected to a fixed link 11 which is welded or otherwise secured to an angle member 12 which extends transversely of the trough 2 and is welded to a supporting framework 13 secured to the trough 2. The eccentric arm 10 is pivoted to the fixed link 11 at point 14.

When motor 7 is operated and eccentric shaft 8 is rotated, a reciprocatory motion is imparted to the conveyor trough 2 through the arm 10 and link 11, pivoting about the point 14. The angle at which the springs 6 are mounted determines the angular motion imparted to the trough 2, and the throw of the eccentric shaft 8 determines the extent of motion or stroke of the trough 2. The angle of throw and the stroke of the trough 2 may be varied considerably. In the embodiment chosen for illustration, the stroke is 1″ and the angle is 30° with respect to the horizontal. This will be clear from Figure 1, where the springs 6 are disposed at an angle of 30° to the vertical and thus the angle of motion of the trough with respect to the horizontal will be 30°. This has been indicated by chain lines in Figure 1.

The apparatus described above is conventional and is available on the open market. It is one of a number of types of vibrating conveyors. They are used principally in conveying particulate materials. In the embodiment illustrated in Figure 3, applicant has chosen small chips of plastic material as illustrative of the many types of material, the delivery of which may be controlled by the apparatus of the invention.

While the invention is particularly applicable to flat horizontal conveyors such as shown, it is also useful with so-called "spiral" vibrating conveyors. In all vibrating conveyors, the conveyor trough is disposed either horizontally or at not more than a slight angle with respect to the horizontal. For instance, the conveyor trough of a "spiral" conveyor may be said to be generally horizontally disposed; it is actually disposed as a helix and may rise at about 9° with respect to the horizontal. Therefore, where the term "horizontal" is used, it is intended to include the flat horizontal type of conveyor shown in Figure 1 and also similar conveyors in which the conveyor trough is inclined upwardly or downwardly slightly (0°–15°).

The trough 2 may be arranged to feed a plurality of hoppers or bins. In the embodiment shown in Figures 1 and 2, the trough is arranged to convey material to five stations, only three of which are shown. The invention is applicable regardless of the number of stations to be fed by the conveyor. It will work as satisfactorily with one station as with five, or more.

As noted in Figure 2, the trough may be divided into four areas or sections 15 by securing spaced partitions 16 to the bottom of the trough. Each of the four divided areas thus provided may be arranged to feed material from the trough 2 to a hopper or other receptacle. A hopper 17 may be provided for supplying material to the conveyor trough 2 for delivery therealong. A delivery spout may be used also, or the material may be deposited upon the conveyor trough by a workman.

A plurality of discharge openings 18 are provided in the bottom of the hopper 2 in the sections 15. In the embodiment chosen for illustration, these are of oblong shape. It is obvious, of course, that the discharge openings may be round, square, or any other desired configuration. It will be apparent that with a divided trough, as shown in Figure 2, it may be desirable to provide a discharge opening for each of the divisions and then provide a discharge opening 19 to take care of any excess material which may be delivered along the conveyor. To insure proper delivery of material into this overflow discharge opening 19, a pivoted gate 20 may be provided, overlying the bottom of the trough 2 and directing material into the discharge opening 19. A fixed gate 20′ may also be provided to insure complete delivery into the discharge opening 19 of all material which passes beyond the partitioned area of the trough 2. The gate 20 is preferably pivoted so that, should it be desired for one reason or another to discharge the excess material from the end of the conveyor rather than through the discharge opening 19, this may be accomplished conveniently.

Leading from each of the discharge openings is a spout 21. In the embodiment shown in Figure 1, each of the spouts 21 enters into a hopper 22. Each of these hoppers delivers material to a vibrating feeder 23 disposed below each of the hoppers.

It will be noted by reference to Figure 3 that the spout 21 is disposed below the upper edge 24 of the hopper and is of substantially lesser area than the area of the hopper into which it projects. The position of the spout 21 with respect to the upper edge 24 of the hopper will be determined by the desired maximum level which the material is to attain in the hopper. In normal practice, with a vibrating feeder 23 as illustrated, the hopper 22 will contain no material in the zone of the discharge spout 21. Any excess of material will be confined to the lower regions of the hopper in most instances. However, should the vibrating feeder 23 be stopped or through some malfunctioning be unable to convey away the material at the desired rate, then material 25 may build up in the hopper 22 to a point where overflowing would normally occur and where interference with the proper functioning of the device would result, as mentioned above. In other operations, it may be desirable to fill a hopper or other receptacle to a given level and then interrupt the further supply of material thereto.

In order to avoid the problems incident to overfilling of the receptacle, the lower edge 26 of the spout 21 which defines the opening is so shaped that it lies at an angle to the horizontal which is substantially the same as the general angle of vibratory motion of the conveyor trough 2. As mentioned above, in the embodiment chosen for illustration, the angle of motion of the trough 2 is in the order of 30° with respect to the horizontal; and, accordingly, the edge 26 of the spout 21 is cut at an angle of 30° to the horizontal.

With this arrangement, as soon as the material 25 in the hopper 22 reaches a level substantially coincident with the edge 26 of the spout 21, defining the opening in the bottom thereof, no further material will feed through the spout into the hopper; rather the material will build up in the spout until it reaches a level parallel with the bottom of the trough 2. Thereupon, further material 27 delivered along the conveyor merely rides over the material in the spout and is conveyed along the length of the trough 2. The conveyor and the attached spout are free to oscillate at a 30° angle without any tendency for the material in the hopper to build up and impede such free and unrestricted movement of the conveyor. At the same time, there is no transfer of any substantial motion from the conveyor and spout to the material in the hopper and through the material to the hopper proper.

While it is preferred to have the angle of the discharge opening in the spout substantially the same as the angle of motion of the trough, 30° in the example under consideration, some variation from this is permissible; although, for best results, both should be as close as possible to the same angle. It should be borne in mind that in vibrating conveyors the trough actually tends to pivot and move in an arcuate path, but in most instances the arc is so great that the path of motion approaches a plane or straight line. For purposes of this invention, this is of no consequence and, therefore, will be deemed to be straight line motion or motion in a fixed plane. A difference in angle of as much as 10° is permissible, but generally it should be kept within 5°; and for optimum results, as noted above, the angle should be the same for both the plane of motion of the trough and the plane defined by the lower edge of the spout.

In Figure 1, the vibrating feeder 23 is delivering material to a hopper 28 for discharge into a pulverizing machine 29. With a unit of this type, it is sometimes desirable to shut down one or more of the feeders 23 because of needed adjustments or other operations to be carried out on the pulverizing units. When this occurs, the material will build up in the hopper 22 above the non-functioning feeder, but it will never overflow the hopper, and in no instance will the proper functioning of the rest of the conveyor unit be impeded. Additionally, as soon as the pulverizer 29 is ready to receive additional material, the vibrating feeder 23 may be started up; and as the level of material in the hopper 22 falls, additional increments of material will be fed from the conveyor trough 2. This is all accomplished automatically without the intervention of any operator.

I claim:

1. In a vibrating conveyor, the combination of a substantially horizontally disposed conveyor trough having a discharge opening in the bottom thereof, a receptacle disposed below said discharge opening for the reception of material fed by said conveyor through said discharge opening, a rigid delivery spout connected to said conveyor trough and movable therewith and leading from said discharge opening into said receptacle below the top thereof, the terminal edge of said spout defining an opening which is disposed at an angle which is substantially parallel to the plane of motion of said conveyor trough, whereby when said receptacle is filled to a predetermined level below the top thereof, additional material fed through said discharge opening will fill said spout and thereafter material will be conveyed over said discharge opening along said conveyor.

2. In a vibrating conveyor, the combination of a substantially horizontally disposed conveyor trough having a discharge opening in the bottom thereof, means imparting a vibratory motion to said conveyor trough at an angle to the horizontal to move material along the length of said trough, a substantially vertically disposed rigid delivery spout connected to said conveyor trough and movable therewith and leading from said discharge opening for disposition within a receptacle below the top thereof to direct material from said conveyor into said receptacle, the terminal edge of said spout defining an opening which is disposed at an angle to the horizontal which is substantially parallel to the plane of motion of said conveyor trough, whereby when said receptacle is filled to a predetermined level below the top thereof, material fed through said discharge opening will fill said spout and thereafter material will be conveyed over said discharge opening along said conveyor.

3. In a vibrating conveyor, the combination of a substantially horizontally disposed conveyor trough having a plurality of discharge openings in the bottom thereof, means for directing overflow material from one discharge opening into another discharge opening, means for imparting a vibratory motion to said conveyor trough at a predetermined angle to the horizontal to move material along the length of said trough, a plurality of substantially vertically disposed rigid delivery spouts connected to said conveyor trough and movable therewith and leading from said discharge openings for disposition within receptacles at predetermined levels below the tops thereof to direct material from said conveyor into said receptacles, the terminal edge of each of said spouts defining openings each of which is disposed at an angle to the horizontal which is substantially parallel to the plane of motion of said conveyor trough, whereby when one of said receptacles is filled to said predetermined level below the top thereof, material fed through the discharge opening leading thereinto will fill said spout and thereafter material will be conveyed over said discharge opening along said conveyor to another discharge opening.

4. In a vibrating conveyor, the combination of a conveyor trough with a discharge opening therein, means imparting a vibratory motion to said conveyor trough at a predetermined angle to move material along the length of said trough, a rigid delivery spout attached to said trough and movable therewith and leading from said discharge opening, a hopper into which said spout extends below the upper rim of said hopper to direct material from said conveyor into said hopper, the area of said hopper surrounding said spout being substantially greater than the area of the discharge opening in the spout to permit unrestricted vibratory motion of said spout and normally free delivery of material therefrom, a vibratory feeder disposed to receive material from said hopper to deliver the same therefrom, the terminal edge of said spout defining an opening which is disposed at an angle to the horizontal which is substantially parallel to the plane of motion of said trough, whereby upon inactivation of said vibratory feeder, material will build up in said hopper to a predetermined level only therein, below said upper rim, and thereafter said spout will be filled with material and excess material will thereupon pass over said discharge opening.

References Cited in the file of this patent

UNITED STATES PATENTS 2,674,381     Cady _____ Apr. 6, 1954